United States Patent Office 3,057,815
Patented Oct. 9, 1962

3,057,815
ESTERS OF POLYMETHYLOL CYCLOHEXANE AND VINYL RESIN COMPOSITION CONTAINING SAME
Jeffrey H. Bartlett, New Providence, and Vincent L. Hughes, Clark, N.J., assignors to Esso Research and Engineering Company, a corporation of Delaware
No Drawing. Filed Oct. 13, 1958, Ser. No. 766,724
9 Claims. (Cl. 260—31.6)

The present invention relates to compounds that are particularly useful as plasticizers for resins. More particularly, it concerns esters, prepared by reacting acids with polymethylol cyclic hydrocarbons, and their use as plasticizers for polymers.

While plasticizers, such as di-isooctyl phthalate (DIOP) and di-2-ethyl hexyl phthalate (DOP), have been widely used in plastic compositions, they are not entirely satisfactory because they have a relatively low heat stability and high volatility. Since in many instances it is desirable to use a plasticizer which is heat stable, relatively non-volatile and oil insoluble, investigations were carried out in search of plasticizers having these properties.

It has now been discovered that certain alicyclic hydrocarbon esters, particularly esters of tri- or tetramethylol alicyclic hydrocarbons having at least one gem dimethylol group, make excellent plasticizers for polymers. They are particularly effective in resins, such as vinyl chloride-containing resins. These plasticizers are unique in that they possess both a low volatility and a high heat stability.

Among the polymers that may be plasticized with the esters of the present invention are resins prepared from vinyl derivatives, such as polyvinyl chloride and vinyl chloride-vinyl acetate copolymers containing between 80 and 95 wt. percent vinyl chloride and 5 and 20 wt. percent vinyl acetate. These resins generally have a specific viscosity (68/68° F.) between about 0.2 and 1.2 and a softening point between about 150 and 160° F. For instance, a vinyl chloride resin, sold under the name of Geon 101, is a white powder having a specific gravity of 1.40±0.05, a specific viscosity of between 0.52 and 0.57, a heat loss of 0.5%, an ash of 0.4% and a softening point between 150 and 160° F. Other polymers include natural rubber, butadiene-styrene rubber, butyl rubber, etc.

The plasticizers which fall within the purview of this invention are esters made by reacting tri- to tetramethylol cyclohexane with various organic acids. They have the following generic formula:

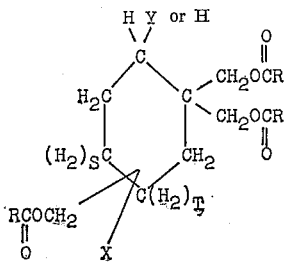

wherein R is a normal or isoalkyl group having 2 to 16 carbon atoms, preferably 5 to 9 carbon atoms. Some suitable alkyl groups include pentyl, hexyl, heptyl, isooctyl, octyl, nonyl, etc.; Y is an alkyl group having 1 to 3 carbon atoms, e.g. methyl; X is a methyl (—CH$_3$) or

(an ester in which R is the same as defined above) group; S is 0 when T is 1 and T is 0 when S is 1. The esters may be prepared with a mixture of monobasic organic acids having an average of 5 to 9 carbon atoms, e.g. n-caproic acid and lauric acid. Suitable esters include the following:

Tricaproate ester of 1,1,4-trimethylol-4-methyl cyclohexane
Tricaprylate ester of 1,1,4-trimethylol-4-methyl cyclohexane
Tetracaproate ester of 1,1,4,4-tetramethylol cyclohexane
Tetracaproate ester of 1,1,3,3-tetramethylol cyclohexane
1,1-dimethylcaproate,4,4-dimethyllaurate cyclohexane The monoaldehyde or mono-functional compounds which are to be used as reactants in the present process may be conventionally prepared by the well-known Diels-Alder process such as described in "Organic Chemistry," by Gillman, volume I, second edition, published by John Wiley & Sons, on page 685. Generally, to prepare the mono-functional or monoaldehyde cycloalkenes which are suitable as reactants, it is desirable to treat conjugated diolefins with acrylic compounds. An adduct of the Diels-Alder type results which is a cycloalkene possessing the functional group of the acrylic compound. Some of the conjugated diolefins which may be used are butadiene, isoprene, piperylene, dimethylbutadiene, and conjugated diolefins resulting from steam cracking of petroleum and having a molecular weight from 54 to about 1000. Also, diolefins of the type of vinylacetylene may be used. These diolefins readily form adducts with such acrylic compounds as acrolein, methacrolein, acrylonitrile, methacrylonitrile, methylacrylate, methyl methacrylate and their homologs, etc. Such adducts having a cycloalkene basic structure are readily oxonated to bifunctional compounds in the presence of a rhodium-containing catalyst.

The pressures employed in oxonating the mono-functional compound to the difunctional compound should range between 1000 to 10,000 p.s.i.g. and preferably between 2000 and 4000 p.s.i.g. A rhodium-containing catalyst is preferably used in the range of 0.01 to 0.5% by weight calculated as metallic rhodium based on the feed. However, up to 5.0% and more, can be used without any serious disadvantages. The upper limit is primarily a practical one and governed by economics. The olefin feed may be used as such but is preferably employed in an inert solvent diluent such as hexane, heptane, cyclohexane, benzene, etc. $C_6$–$C_{11}$ paraffins are particularly preferred since they are easily separated from the oxygenated phase. While other diluents such as ethers, other aldehydes and alcohols, may be used, it is desirable to employ a diluent which does not contain a reactive functional group. In general, it is preferred to use a diluent to feed ratio greater than 1.5/1 on a volume basis, but larger or smaller amounts may be used and a suitable range is .5 to 10/1. The carbon monoxide to hydrogen ratio will preferably be about 1/1, however, from 1/5 to 5/1 is operable.

The trimethylol cyclic compounds may be prepared by reducing the monoaldehyde cyclic compound to a methylol group, oxonating the reduced compound to a bifunctional cyclic compound having both methylol and aldehyde groups attached to the ring and reacting the bifunctional compound with formaldehyde.

To prepare the tetramethylol compounds, the dialdehyde cyclic compounds are condensed with a sufficient amount of formaldehyde to form two gem dimethylol groups that are meta or para.

Any conventional techniques may be used to esterify the polyols. The esterification of the polymethylol alicyclic compounds may be carried out, if desired, in the presence of a catalyst. For instance, the polymethylol compound and the organic acids may be condensed in toluene in the presence of p-toluene sulfonic acid at the boiling point of the mixture until no more water can be removed as an azeotrope. The reaction mixture is diluted with toluene and washed with a 5% NaOH solution and finally with water to remove any acids. The toluene is evaporated on a steam bath and the ester distilled through a short path still. The reaction time is generally between 2 to 5 hours at a temperature between about 125 and 175° C.

The acids used in the preparation of the esters generally have an average of 5 to 9 carbon atoms. It has been noted that in general the straight chain acids, as distinguished from the iso, or branched-chain type acids, form the more desirable esters, and therefore they are preferred. Pure monobasic acids, such as caproic acid, or mixtures of monobasic acids, such as n-caproic acid and n-caprylic acid, may be used.

The amount of ester plasticizer employed with a given resin will vary according to the particular compound or mixture of compounds used, and the type of product desired. Data obtained in a study of plasticizers indicate it is generally desirable to use a minor amount of plasticizer, e.g. between about 25 and 75 parts by weight plasticizer per 100 parts by weight resin, and it is preferable to use between about 40 to 60 parts by weight of the plasticizer per 100 parts by weight of vinyl resin. In the case of vinyl chloride-containing resins, a desirable quantity of ester is about 50 parts by weight.

In addition to the ester plasticizer, the resin may contain stabilizers, such as barium ricinoleate, cadmium naphthenate, sodium citrate, dibasic lead stearate and alkali metal organo phosphates. They are generally used in amounts between about 0.1 and 15 parts by weight per 100 parts by weight of resin. It is usually preferred to use between about 1 and 5 parts by weight of these stabilizers.

The following examples are submitted to illustrate some of the embodiments of the present invention.

EXAMPLE 1

*Preparation of 1,1,3 (and 4) Trimethylolcyclohexane*

Tetrahydrobenzaldehyde (adduct of butadiene and acrolein) was hydrogenated in the presence of a copper chromite catalyst at 150° C. to produce tetrahydrobenzyl alcohol. This unsaturated alcohol was then oxonated in the presence of rhodium oxide catalyst at 125° C. to 155° C. On distillation of 679 g. of the oxo product in a short path still a 136 g. fraction was obtained at 65° C. to 95° C. under 0.7 mm. pressure having a free carbonyl number of 249 mg. KOH/gm. (theoretical carbonyl number of hydroxymethylcyclohexylcarboxaldehyde = 394 mg. KOH/gm.). The relatively crude cut of hydroxymethylcyclohexylcarboxaldehyde was combined with a similar cut from a second oxonation experiment and the composite was converted to 1,1,3 (and 4) trimethylolcyclohexane as follows:

A 2 liter 4 neck Morton flask equipped with a stirrer, condenser, thermometer and dropping funnel was charged with 246 g. of the above hydroxymethylcyclohexylcarboxaldehyde, 500 cc. of 99% isopropyl alcohol and 453 g. of 35% formaldehyde. After warming the mixture to 35° C. it was maintained at 35° to 45° C. during ½ hour while 210 g. of 40% NaOH was gradually added. It was maintained at 40° to 50° C. for 3½ hours and then at 50° to 60° C. for 1 hour. The mixture was then allowed to cool to room temperature. Two layers had formed and were separated. The top alcoholic layer was evaporated on a steam bath to remove the alcohol. Then the residue was treated with acetone to dissolve the polyhydric compound and at the same time to precipitate any sodium formate. After filtration the filtrate was evaporated to remove acetone. A second treatment with acetone was carried out and then the crude polyhydric compound was distilled in a short path still with the following results:

| Cut | Boiling Point, °C. | Pressure, mm. | Amount, g. |
| --- | --- | --- | --- |
| 1 | 105–166 | 0.3 | 55 |
| 2 | 166–175 | 0.3 | 123 |
| Bottoms | | | 12 |

Most of cut 2 had a boiling point of 166–168° C. at 0.3 mm. pressure.

*Preparation of Tricaproate Ester of 1,1,3 (and 4) Trimethylol Cyclohexane*

A 2 liter 2 neck flask equipped with a thermometer and a water trap with a condenser was charged with 72 g. of 1,1,3 (and 4) trimethylol cyclohexane, 175 g. n-caproic acid, 5 g. of toluene sulfonic acid and 300 cc. of toluene. This mixture was refluxed for 2½ hours during which 22.6 cc. of water was collected in the trap. It was then diluted with 500 cc. of toluene and washed with 5% NaOH, then with water. After evaporating the solvent on the steam bath the resulting 186 g. of ester was distilled in a short path still. A fraction of 153 g. boiling at 187° to 198° C. under 0.05 mm. pressure was obtained. It had a neutralization of 0.31 mg. KOH/gm. and a saponification number of 359.6 mg. KOH/gm. (theoretical saponification number for the tricaproate ester=359.1 mg. KOH/gm.). The viscosity of the ester at 100° F. was 27.66 centistokes and at 210° F. was 5.07 centistokes, giving a viscosity index of 132. Pour point of the ester was below −75° F.

EXAMPLE 2

*Preparation of Tetramethylol Cyclohexane*

Hexahydrophthaldehyde which had been prepared by the oxonation of tetrahydrobenzaldehyde (adduct of butadiene and acrolein) was treated with formaldehyde for conversion to the tetramethylol cyclohexane as follows:

A 3 liter 4 neck flask equipped with a stirrer, condenser, thermometer and dropping funnel was charged with 140 g. (1 m.) hexahydrophthaldehyde, 405 g. (5 m.) of 37% formaldehyde and 800 cc. of 95% ethyl alcohol. To this mixture was added 176 g. of a 50% NaOH solution during 1½ hours at 35 to 40° C. Stirring was continued overnight at room temperature of about 25° C. for a total reaction time of 18 hours. During this time a white crystalline product of tetramethylol cyclohexane separated from the solution. It was filtered off and dried on a porous plate. Yield=68 g., hydroxyl number=1021 mg. KOH/g. (theoretical hydroxyl number=1099 mg. KOH/g.). The mother liquor was concentrated from which 94 g. of an amorphous gummy product was obtained.

*Preparation of Tetramethylol Cyclohexane Ester*

A 2 liter 4 neck flask equipped with a stirrer, thermometer and water trap with a condenser was charged with 57 g. (0.28 m.) tetramethylol cyclohexane (crystalline), 300 g. n-caproic acid, 2 g. toluene sulfonic acid and about 300 cc. of xylene. This mixture was refluxed at 160 to 195° C. for 3½ hours—the temperature being controlled by varying the amount of xylene as the entraining agent. During this time a total of 20.8 cc. of water was collected. The resulting product was diluted with 1 liter of toluene and then given two washes with 5% NaOH followed by water washing. After evaporation of the solvents on the steam bath the residue of 151 g. was distilled in a short path still in which 138 g. of the tetracaproate ester was obtained having a boiling point of 245° C. to 253° C. under 0.25 mm. pressure. Its neutralization number was 0.28 mg. KOH/gm. and its saponification number was 371.2 mg. KOH/gm. (theoretical saponification number=376.0 mg. KOH/gm.). This ester had a viscosity at 100° F. of 59.45 centistokes and at 210° F. of 8.27 centistokes and a viscosity index of 116.

EXAMPLE 3

One hundred parts of a polyvinyl chloride resin having a specific gravity of 1.40±0.05 and a softening point between 150 and 160° F. was admixed with 2 parts of sodium organo phosphate (16.67% Na, 8.33% P and 49.12% ash), 1 part of dibasic lead stearate and 50 parts of a mixture of the normal caproate ester of 1,4-gem dimethylol cyclohexane and the normal caproate ester of 1,3-gem dimethylol cyclohexane until the blend was lump-free. The resulting composition was then homogenized in a suitable mixer, such as a Banbury, and extruded, sheeted and molded into a finished product. The sheeted stock was molded at between 300 and 320° F. in an ASTM mold (D16–41), yielding slabs 6 x 6 x 0.75 inches. Each sample was evaluated for:

(a) Volatility after 7 days at 100° C., by determining the weight loss of plasticizer.
(b) Extractability of the plasticizer with Primol D after 7 days at 52° C., by determining the weight loss of plasticizer.
(c) Torsional modulus properties at 25 and −25° C. (Torsional modulus is expressed in dynes/sq.cm. and the procedure is described in ASTM Standards for Plastics D 1043–51.)
(d) Its physical properties, such as tensile strength, modulus at 100% elongation and elongation.
(e) The percent tensile strength and elongation retained after aging 7 days at 100° C.

The results are set forth in table below:

| | Tetramethylol Esters | DOP |
|---|---|---|
| Original Properties: | | |
| Tensile, p.s.i. | 3,160 | 3,000 |
| Modulus at 100% Elongation, p.s.i. | 2,310 | 1,855 |
| Elongation, percent | 305 | 320 |
| 7 Days Aging at 100° C.: | | |
| Percent Tensile Retained | 99.5 | 85 |
| Modulus at 100% Elongation, p.s.i. | 2,260 | 2,325 |
| Percent Elongation Retained | 100.0 | 58 |
| Volatility, Percent Plasticizer Lost | 0.6 | 20.6 |
| Primol D Extraction—7 Days at 52° C.: Percent Plasticizer Loss | 4.5 | 8.9 |
| Torsional Modulus (10$^4$ Units): | | |
| +25° C. | 0.36 | 0.28 |
| −25° C. | 32.4 | 26.0 |

The data show that the tetramethylol ester is an outstanding plasticizer, particularly in regard to its volatility when aged at 100° C. for 7 days. It also protects the resin by preventing a loss of its physical properties at 100° C. This is illustrated by the tensile strength and elongation retained after aging at this elevated temperature.

EXAMPLE 4

Example 3 was repeated with the exception that the plasticizer was a mixture of the normal caproate ester of 1,1 dimethylol-4-methylol cyclohexane and the normal caproate ester of 1,1 dimethylol-3-methylol cyclohexane. The results are set forth in the table below:

Original properties: Trimethylol esters
Tensile, p.s.i. _____ 3250
Modulus at 100% elongation, p.s.i. _____ 1860
Elongation, percent_____ 300
7 days aging at 100° C.:
  Percent tensile retained_____ 92.0
  Modulus at 100% elongation, p.s.i._____ 1700
  Percent elongation retained_____ 101.7
  Volatility, percent of plasticizer lost_____ 2.1
Primol D extraction—7 days at 52° C.: percent plasticizer loss_____ 10.36
Torsional modulus (10$^4$ units):
  +25° C._____ 0.25
  −25° C._____ 24.0

From the above data it is seen that while the triesters are very satisfactory plasticizers, they are not as desirable as the tetraesters employed in Example 3. The volatility can be improved by using higher molecular weight acids, e.g. caprylic acid, to prepare the esters.

*Preparation of Mixed Tetraester of Tetramethylol Cyclohexane with $C_8$ and $C_{10}$ Acids*

The mixed tetraester of tetramethylol cyclohexane is prepared from tetramethylol cyclohexane by esterification with a mixture of $C_8$ and $C_{10}$ (caprylic and decanoic) acids. This is accomplished by charging a stirred reactor, equipped with a water trap and condenser, with 1 mole of tetramethylol cyclohexane and approximately 4.1 moles of a mixture of $C_8$ and $C_{10}$ acids. To this mixture is also added about 10 g. toluene sulfonic acid as a catalyst and sufficient xylene as an entraining agent to maintain a temperature of about 150° to 190° C. in the flask. The resulting product is washed with dilute NaOH and then with water. After removing the xylene solvent by stripping in a vacuum still or by blowing with nitrogen on a steam bath, a tetraester is obtained which may contain some pure tetra $C_8$ ester and tetra $C_{10}$ ester in addition to various combinations of $C_8$ and $C_{10}$ mixed esters. Thirty parts by weight of these $C_8$ and $C_{10}$ esters are compounded with 100 parts by weight of a polymer such as butyl rubber to soften it and make it easier to process.

The alicyclic ester compounds of the present invention may also be used as synthetic lubricants and lubricant oil additives. Many of these esters have low pour points and viscosity indices of about 110 to 140.

Resert may be had to various modifications and variations of the present invention without departing from the spirit or scope of the appended claims.

What is claimed is:
1. Composition of matter comprising 100 parts by weight of polyvinyl chloride resin and about 25 to 75 parts by weight of tetracaproate ester of 1,1,4,4-tetramethylol cyclohexane.
2. Composition of matter comprising 100 parts by weight of polyvinyl chloride resin and about 25 to 75 parts by weight of tricaproate ester of 1,1,3-trimethylol-4-alkyl cyclohexane.
3. A composition of matter which comprises an ester represented by the following generic formula:

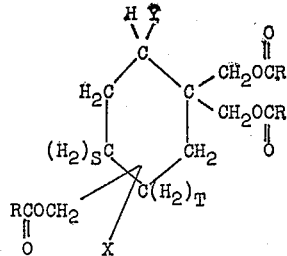

wherein R is selected from the group consisting of normal and isoalkyls having 2 to 16 carbon atoms; Y is an alkyl group having 1 to 3 carbon atoms; X is selected from the group consisting of methyl and

where R is defined as above; and S and T are integers whose sum is 1.
4. The composition of claim 3 wherein the group R has 5 to 9 carbon atoms.
5. The composition of claim 3 wherein said ester is the tricaproate ester of 1,1,4-trimethylol-4-methyl cyclohexane.
6. The composition of claim 3 wherein said ester is the tricaprylate ester of 1,1,4-trimethylol-4-methyl cyclohexane.

7. The composition of claim 3 wherein said ester is the tetracaproate ester of 1,1,4,4-tetramethylol cyclohexane.

8. The composition of claim 3 wherein said ester is the tetracaproate ester of 1,1,3,3-tetramethylol cyclohexane.

9. A composition of matter comprising 100 parts by weight of a vinyl resin selected from the group consisting of polyvinyl chloride and vinyl chloride vinyl acetate copolymer resins and about 25 to 75 parts by weight of the ester of claim 3.

References Cited in the file of this patent

UNITED STATES PATENTS

| | | |
|---|---|---|
| 2,912,447 | Brannock | Nov. 10, 1959 |
| 2,947,722 | Boardman | Aug. 2, 1960 |